(12) United States Patent
Bartkowiak et al.

(10) Patent No.: US 7,010,530 B2
(45) Date of Patent: Mar. 7, 2006

(54) EVENT MANAGEMENT SYSTEM

(75) Inventors: Brian Bartkowiak, Troy, MI (US); David Drews, Bloomfield, MI (US); David Bean, West Bloomfield, MI (US); Gregory Mareski, Beverly Hills, MI (US); Laura Hanna, Birmingham, MI (US); Steven A. Westerholm, Sterling Heights, MI (US)

(73) Assignee: George P. Johnson Company, Auburn Hills, MI (US)

( * ) Notice: Subject to any disclaimer, the term of this patent is extended or adjusted under 35 U.S.C. 154(b) by 0 days.

(21) Appl. No.: 09/755,924

(22) Filed: Jan. 5, 2001

(65) Prior Publication Data

US 2001/0056507 A1 Dec. 27, 2001

Related U.S. Application Data

(60) Provisional application No. 60/174,726, filed on Jan. 6, 2000.

(51) Int. Cl.
*G06F 17/30* (2006.01)

(52) U.S. Cl. .......................................... 707/9; 348/150

(58) Field of Classification Search .................... 705/5; 707/102, 517, 3, 10; 345/753, 848; 79/818; 717/101, 120, 124; 709/223, 247; 713/201
See application file for complete search history.

(56) References Cited

U.S. PATENT DOCUMENTS

| | | | | |
|---|---|---|---|---|
| 5,369,570 A | * | 11/1994 | Parad | 705/8 |
| 5,634,016 A | * | 5/1997 | Steadham et al. | 345/753 |
| 5,911,143 A | * | 6/1999 | Deinhart et al. | 707/103 R |
| 6,049,332 A | * | 4/2000 | Boetje et al. | 345/721 |
| 6,198,906 B1 | * | 3/2001 | Boetje et al. | 455/3.01 |
| 6,292,798 B1 | * | 9/2001 | Dockter et al. | 707/9 |
| 6,324,647 B1 | * | 11/2001 | Bowman-Amuah | 713/201 |
| 6,370,573 B1 | * | 4/2002 | Bowman-Amuah | 709/223 |
| 6,397,336 B1 | * | 5/2002 | Leppek | 713/201 |
| 6,405,364 B1 | * | 6/2002 | Bowman-Amuah | 717/101 |
| 6,583,813 B1 | * | 6/2003 | Enright et al. | 348/150 |
| 6,591,068 B1 | * | 7/2003 | Dietz | 396/429 |
| 6,662,357 B1 | * | 12/2003 | Bowman-Amuah | 717/120 |
| 6,773,953 B1 | * | 8/2004 | Gaylord | 438/57 |
| 6,853,739 B1 | * | 2/2005 | Kyle | 382/115 |
| 2002/0128934 A1 | * | 9/2002 | Shaer | 705/27 |

* cited by examiner

*Primary Examiner*—Jean M. Corrielus
(74) *Attorney, Agent, or Firm*—Gifford, Krass, Groh, Sprinkle, Anderson & Citkowski, P.C.

(57) ABSTRACT

A system is disclosed for the planning, management and execution of events that permits the event manager, client, convention personnel, and suppliers to coordinate activities and rapidly disseminate information. Preferably, the system includes a repository of information. All or portions of the information may be electronically accessed by the various parties, subject to the limitations imposed by the event manager. Real time information is provided to the parties, including the ability to observe the progress of the production of the exhibit in real time from remote locations.

24 Claims, 15 Drawing Sheets

EVENT MANAGEMENT SYSTEM

REFERENCE TO RELATED APPLICATIONS

This application claims priority of U.S. provisional patent application Ser. No. 60/174,726 filed Jan. 6, 2000, the entire content of which is incorporated herein by reference.

FIELD OF THE INVENTION

The present invention generally relates to event management. More particularly, the present invention provides an automated, end-to-end system for enterprise event management, including comprehensive interparty coordination services as well as a real time progress monitor via video camera.

BACKGROUND OF THE INVENTION

The production and management of events and exhibits requires the coordination of many resources for an extensive period of time. Planning for an event may begin more than a year prior to the actual exhibit. The initial planning includes developing a budget for the exhibit and producing an exhibit within the budget. Exhibit production includes booking space for the exhibit or convention facility, designing and producing the exhibit, assembling the exhibit at the exhibition site, and coordinating the personnel for the exhibit.

Typically, an event manager works with the client to produce the exhibit, and makes all the arrangements to install the exhibit at the convention site. Thus, the event manager must coordinate activities with the client, convention producer, convention facility, and various contractors and suppliers.

Communication between the client, event manager and suppliers is extensive. Information must be shared and provided to a number of parties. Frequently, design and production modifications are ordered during the production of the exhibit, thus necessitating copious communications to multiple parties, including those who must effect such modifications and those affected by the modifications. The cross-party communications often give rise to considerable confusion, resulting in error, delay, time, and budget issues.

In light of the foregoing, it is desirable to provide an integrated, deployable event management model with comprehensive, interparty communication functionality on a real time basis.

SUMMARY OF THE INVENTION

Accordingly, a core management system and communications platform has been developed which permits the event manager, client and suppliers to access information and data (hereafter, information) from a central source on a real time basis. Thus, the current status of preparation can be accessed. Preferably, the system includes a repository for the information, an interface for access to the information, and a restriction component to restrict access to portions of the information.

Typically, the system includes a repository such as a database having information pertaining to event management. It is contemplated that the database has predesignated levels, areas, categories or other designations with regard to the information contained therein. The database may be designed and implemented according to a variety of schema; e.g., ontological model, existing relational or object-oriented framework. The event management services provider (hereafter, provider) or others populate the database according to a predetermined plan. Once populated, data in the database may be modified, deleted, or otherwise manipulated.

The interface permits access to information, or portions thereof, in the database. Generally, an interactive software component such as a digital interface provides the interface functionality. For example, the database and a digital interface reside on a website server accessible via the World Wide Web. Various parties utilize a personal computer (PC) to establish a communication link via the Internet to the to the website server. Once connected, the system provides a home page having a text field to facilitate authentication and access. Additionally, the interface provides access to real time video images of the event booth and event site.

The restriction components functions to authenticate users, ascertain appropriate levels of access for each user, and restrict the access of each user to the information corresponding to the appropriate level of access. Typically, the provider assigns a unique identification code to each user or group of users; e.g., clients, suppliers, etc. The provider determines an appropriate access scheme for user or group, and records a list of the unique identification codes and corresponding level of access. For example, the restriction component embodies a software interface to receive a unique identification code via the text field in the home page for authentication and access. The software interface searches an electronic record to authenticate the unique identification code, ascertain the corresponding level of access, and accordingly restrict access to the designated level of information.

The foregoing examples are offered for illustrative purposes only; therefore, a skilled artisan will note that the foregoing examples in no way limit the invention disclosed herein.

BRIEF DESCRIPTION OF THE DRAWINGS

FIG. 6 are sample screens showing a library card and a homepage;

FIG. 7 are sample screens having information pertinent to an event marketing brief;

FIG. 12 are sample screens having information pertinent to supervisor scheduling;

DETAILED DESCRIPTION OF THE PREFERRED EMBODIMENTS

Figure 1:
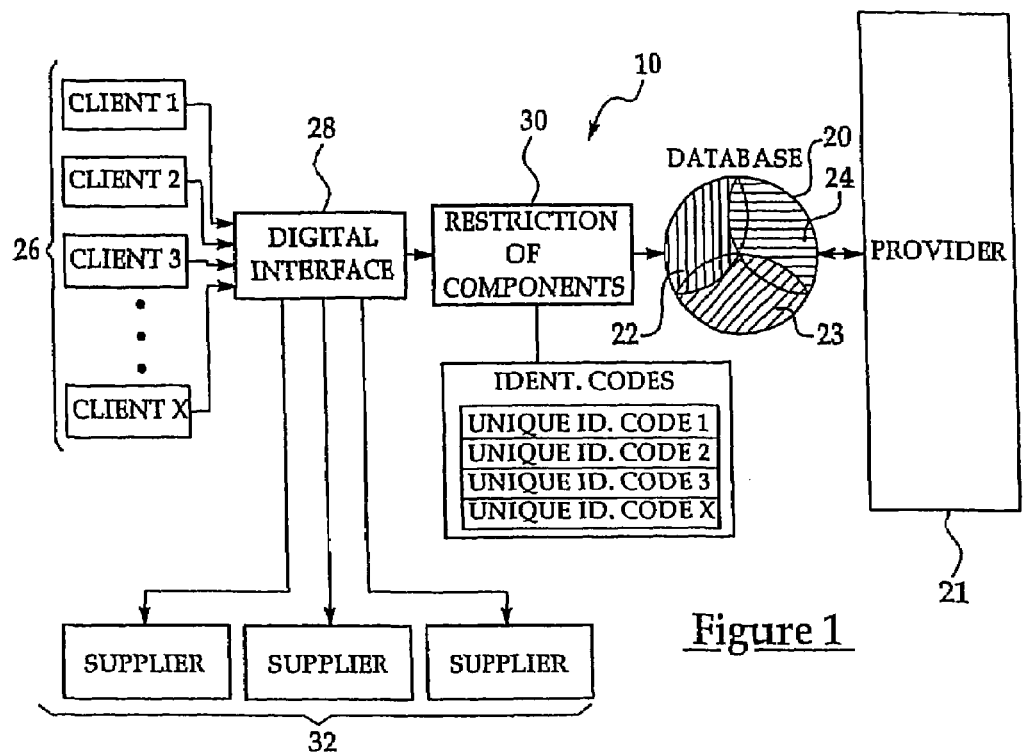
FIG. 1 is an ontological model of a system relationship according to the preferred embodiment of the present invention.

The preferred embodiment of the event management system 10 provides an automated tool for comprehensive event management and communications facilitation as shown in FIG. 1. The system includes a database 20 which is accessible on a real time basis to the event manager or provider 21, to a plurality of clients 26 for whom events are being managed, and to a plurality of suppliers 32 who are providing services and products in connection with the events. The database 20 includes information and associated software. Information is segregated into a plurality of information categories 22. As sort forth more fully below, the information includes such information as financial 23, contract information 24, and construction plans 25.

Clients 28 and suppliers access the information through a digital interface 28 and restriction of component program 30. The restriction program 30 includes predetermined levels of access and privilege rules. Generally, the rules include a definition of the users or groups permitted access to the information, and a list of the parties authorized to add, delete, or modify the information. More particularly, the restriction program (component) 30 includes a number of unique identification codes, each of which corresponds to a level of access to information in the database 20. The unique identification codes are stored in the restriction program (component) 30 in a file or record. Additionally, the software of the digital interface 28 is operable to receive a unique identification code from a user and then search the record of the restriction program (component) 30 for that unique identification code. Once found, the digital interface 28 will ascertain the level of access corresponding to the unique identification code and then limit access to the information in the database 20 according to the ascertained level of access. As such, information may be accessed via the digital interface 28 and the restriction component 30. Accordingly, the system provides access for the suppliers 32 to the information category 23 via the digital interface 28 and restriction component 30. The system permits the provider 21 global access to any and all information, as well as full privilege and control over the entire corpus of information as well as the database scheme.

Figure 2:
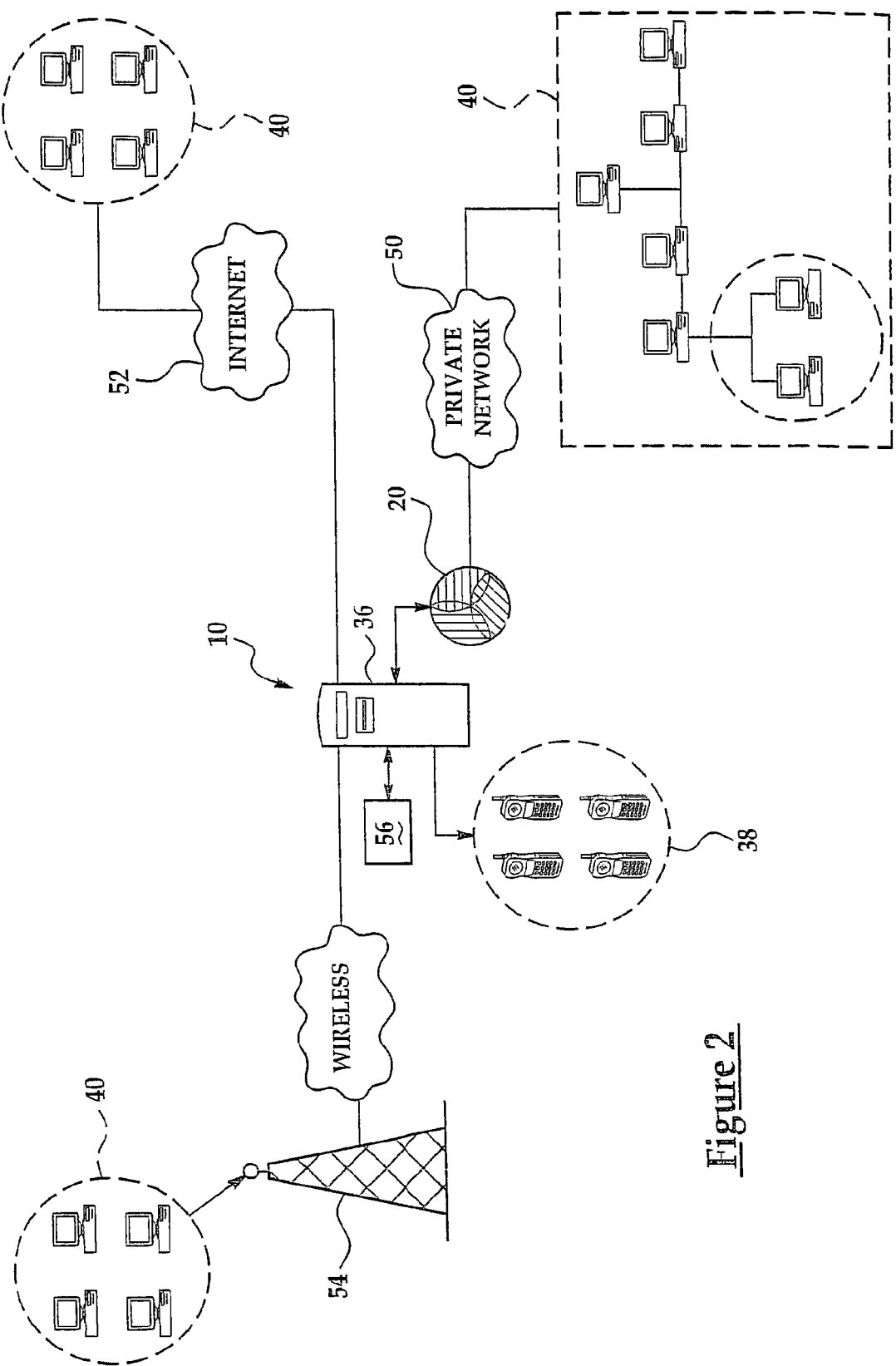
FIG. 2 is a flow chart showing a hierarchical overview of a computer system enterprise according to the current invention.

As shown in FIG. 2, the database 20 is associated with a local computing environment, including a server 36 and one or more local devices 38. The database 20 communicates with the server 36 and the local devices 38 via a communication link; e.g., direct connection, local bus, etc.

The database 20 is accessible by various remote devices 40. The devices include PCs, handheld computing devices, wired or wireless telephone, Web TV, and others. The remote devices access the database 20 via a variety of communication conduits, including private communication networks 50, public communications networks such as the Internet 52, connectivity via the electromagnetic energy spectrum (wireless) 54, and the like.

Individual employees of a client are assigned separate log on access numbers and passwords so an employee may be provided access to financial information 22 and contract information 23, but another employee may have access only to contract information 23. Likewise, the ability to alter information is restricted by restriction component software 30.

The communication platform and database are accessible through a single point of entry, for example, the server 36. Typically, the server 36 and its associated software 56 provide event management functionality via one or more software applications which are tied to the database 20. The application software 42 (hereafter, the event management software) may be proprietary, off-the-shelf, or a combination of both, so long as the functionality described herein is satisfied. Further, various versions of the application software are platform independent, thus providing the event management functionality regardless of enterprise hardware and operating systems architecture.

The server 36 and associated software 56, the database 20, and the event management software 42 interact to provide the interface 28 through a plurality of webpages to the user of the system, as hereinafter detailed. Once in communication with the server 36, the server 36 and its associated software 56 invoke the event management software to provide the interface having a plurality of screens. The screens contain information from the database 20 (as hereinafter detailed), which the user views as webpages via browser software on the remote device.

Figure 3:
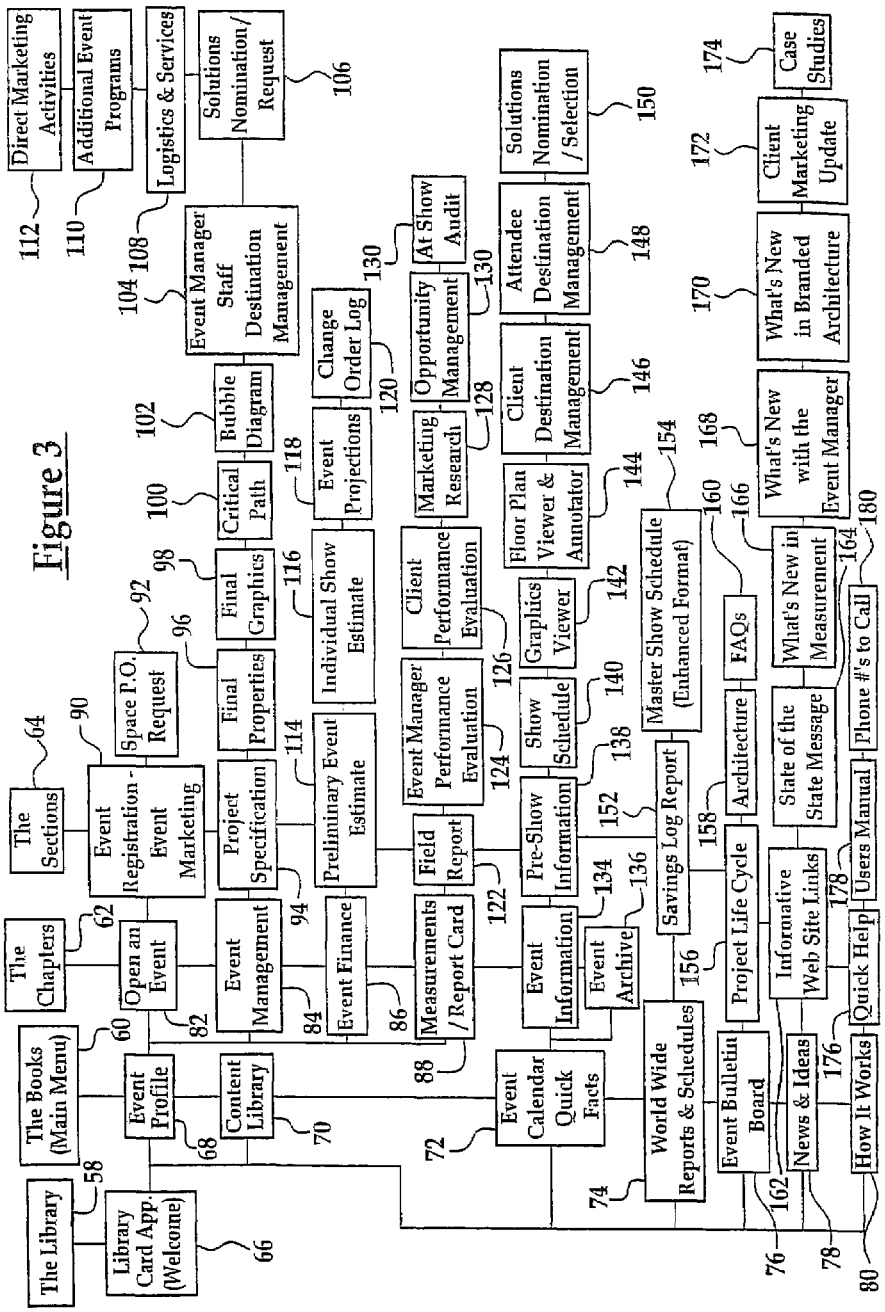
FIG. 3 is a chart of a functional architecture plan of an event management process application is shown.

As shown in FIG. 3, a functional architecture plan of the application software 40 is shown. The functional hierarchy of the application software 40 incorporates two main components, a library 58, and books 60. The books 60 are further subdivided into chapters 62, and the chapters 62 are subdivided into sections 64. The library 58 incorporates a library card application and a welcome message 66.

The books 60, also deemed the main menu of the event management software, include seven main components for access by authorized users. The seven main components are an event profile 68, a content library 70, an event calendar and quick facts 72, a world-wide reports and schedules 74, an event bulletin board 76, news and ideas 78, and a "how it works" 80 or help section.

Each of the seven main components is further subdivided into chapters and/or sections. For example, the event profile 68 includes a chapter for opening an event 82, event management 84, event finance 86, and measurement and report 88. The event profile 68 chapters are further subdivided into sections. The open an event 82 chapter offers an event registration and event marketing brief section 90, as well as a space purchase order request 92.

The event management chapter includes sections for project specification 94, final properties 96, final graphics 98, a critical path 100, and a bubble diagram 102 for the event. Additionally, a user interface with destination management 104 and solutions nomination 106 is provided, along with logistics and services 108, additional event programs 110, and direct marketing activities 112.

The additional event programs 110 include, for example, attendee registration functions. The attendee registration function permits individuals attending a convention to register for the event online. The attendee will be able to specify specific sessions, seminars, or programs. The attendee may pay for the event(s), elect to receive specific promotional information, and/or coupons for use at the event. The attendee can specify travel options, as well as lodging. The attendee can view maps, as well as general information about the location of the event. Links to remote or external services, such as suppliers, marketing, and additional event programs are provided. All necessary information is entered by the event manager or client. The event finance 86 chapter of the event profile 68 includes a preliminary event estimate 114, individual show estimate 116, projections 118, and a change order log 120. Finally, the measurements and report card 88 chapter of the event profile 68 includes field reports 122, performance evaluation by event manager 124, performance evaluation by the client 126, marketing research 128, opportunity management 130, and an at-show audit 132 section.

The event calendar and quick facts 72 book includes the chapters for event information 134 and event archive 136. The event information 134 chapter includes sections for preshow information 138, master show schedule 140, graphics viewer 142, floor plan viewer and annotator 144, and user interfaces for client destination management 146, attendee destination management 148, and finally, an a solutions nomination and selection section 150. The worldwide reports and schedules 74 book includes sections for a savings log report 152 and a master show schedule 154. The event bulletin board 76 chapter includes sections for a project life cycle 156, architecture 158, and a frequently asked question section 160. The news and ideas 78 chapter includes sections for associated website links 162, state of the state board 164, "what's new in measurement" 166, "what's new with the event manager" 168, "what's new in branded architecture" 170, client marketing update 172, and case studies 174. The "How It Works" 80 chapter contains sections for quick help 176, a user's manual 178, and phone numbers to call 180.

Figure 4:
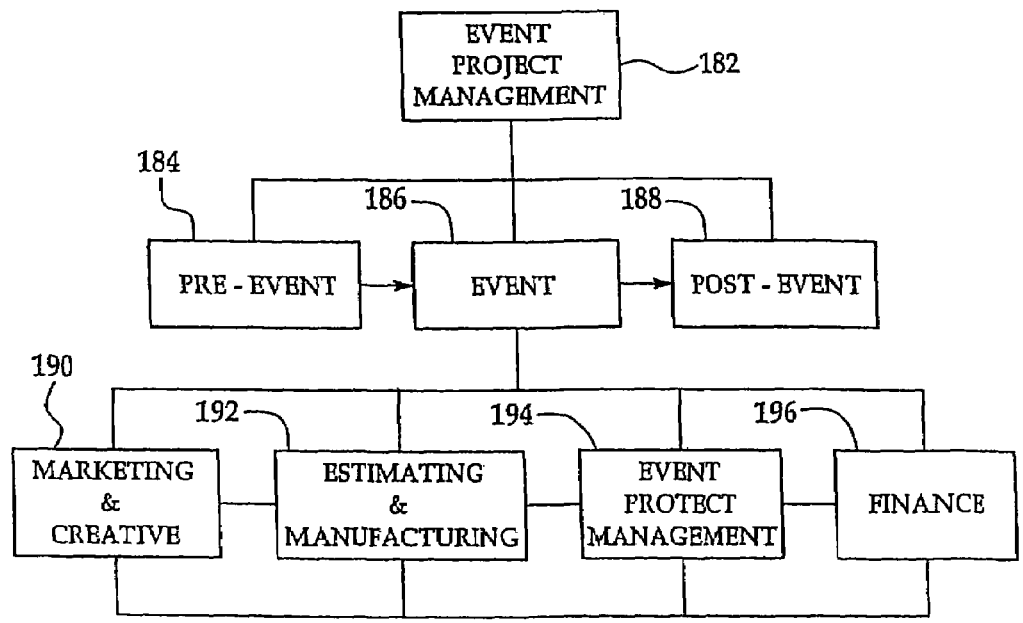
FIG. 4 is a schematic having phases of event management.

Referring now to FIG. 4, there is shown a schematic defining the phases of event management. Typically, the project management 182 is divided into a pre-event 184 phase, event phase 186, and post-event phase 188. The phases may be contiguous or overlapping. The phases include task related to marketing and creative pursuits 190, estimating and manufacturing 192, event project management 194, and finance 196.

Figure 5:
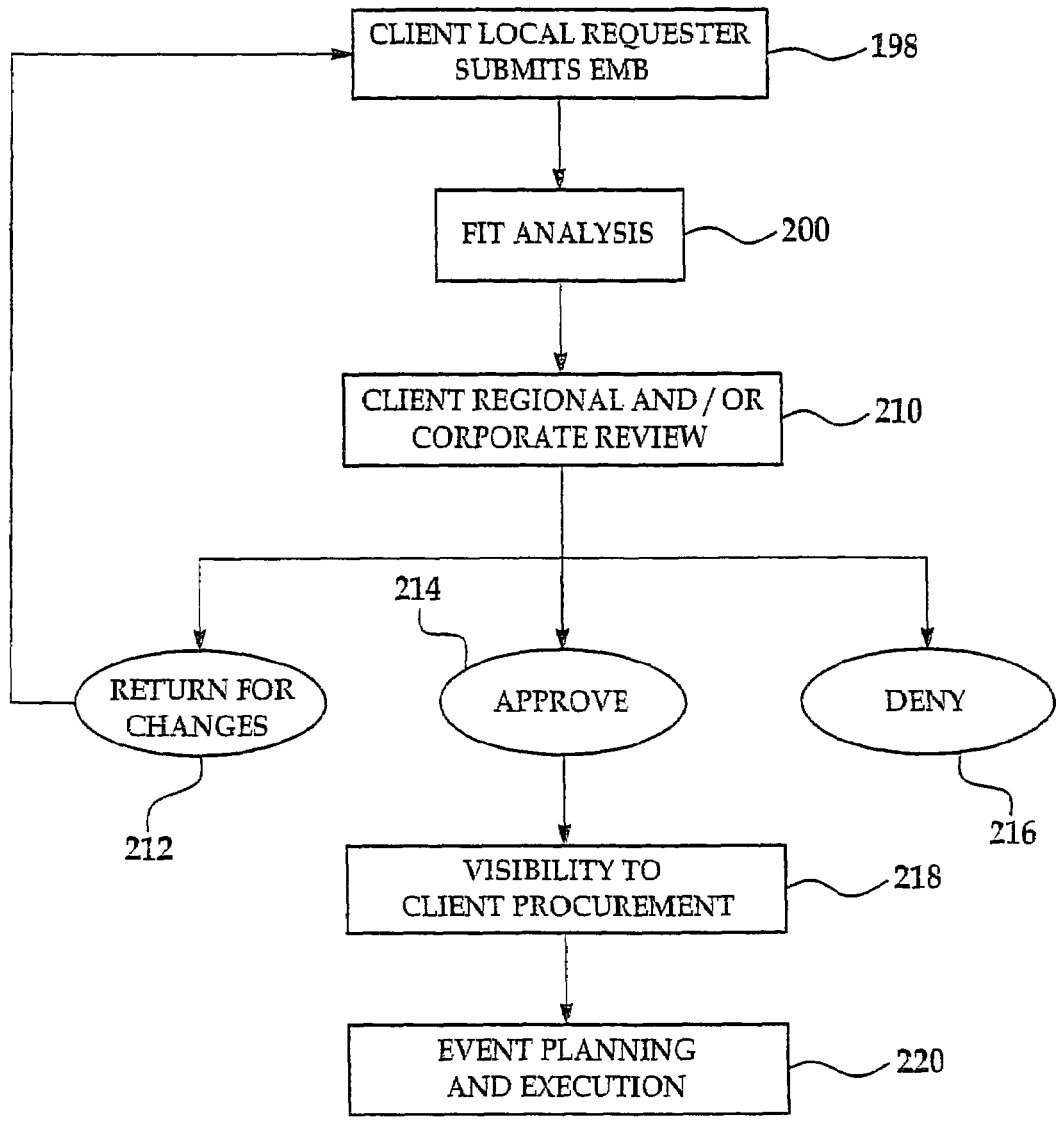
FIG. 5 is a typical process cycle related to a client/local requestor submission.

The pre-event phase includes various processes and webpages screens directed to the completion of pre-event phase task. For example, FIG. 5 illustrates a typical process cycle related to submission of an event marketing brief wherein a client requests or submits an event marketing brief 198 for a fit analysis 200 by the event manager. Pursuant to the fit analysis 200, a regional and/or corporate review 210 takes place. The regional and/or corporate review 210 results in a return for changes 212, and approval 214a return for changes 212, and approval 214, or a denial 216. If the review 210 is returned for changes 212, the event marketing brief must start the process over with the submission at the local requestor level 198. If the request is approved 214, the process proceeds to visibility to client procurement 218, and to event planning and execution 220.

During the event planning and execution, the event manager or client input information or data into the event management system via a plurality of screens of the interface 28. Typically, the screens are viewed on a display device such as the monitor of a PC, and data or information is entered via an input device such as a keyboard. Various sections prompt the entry of information by the client or event manager.

Figure 14:
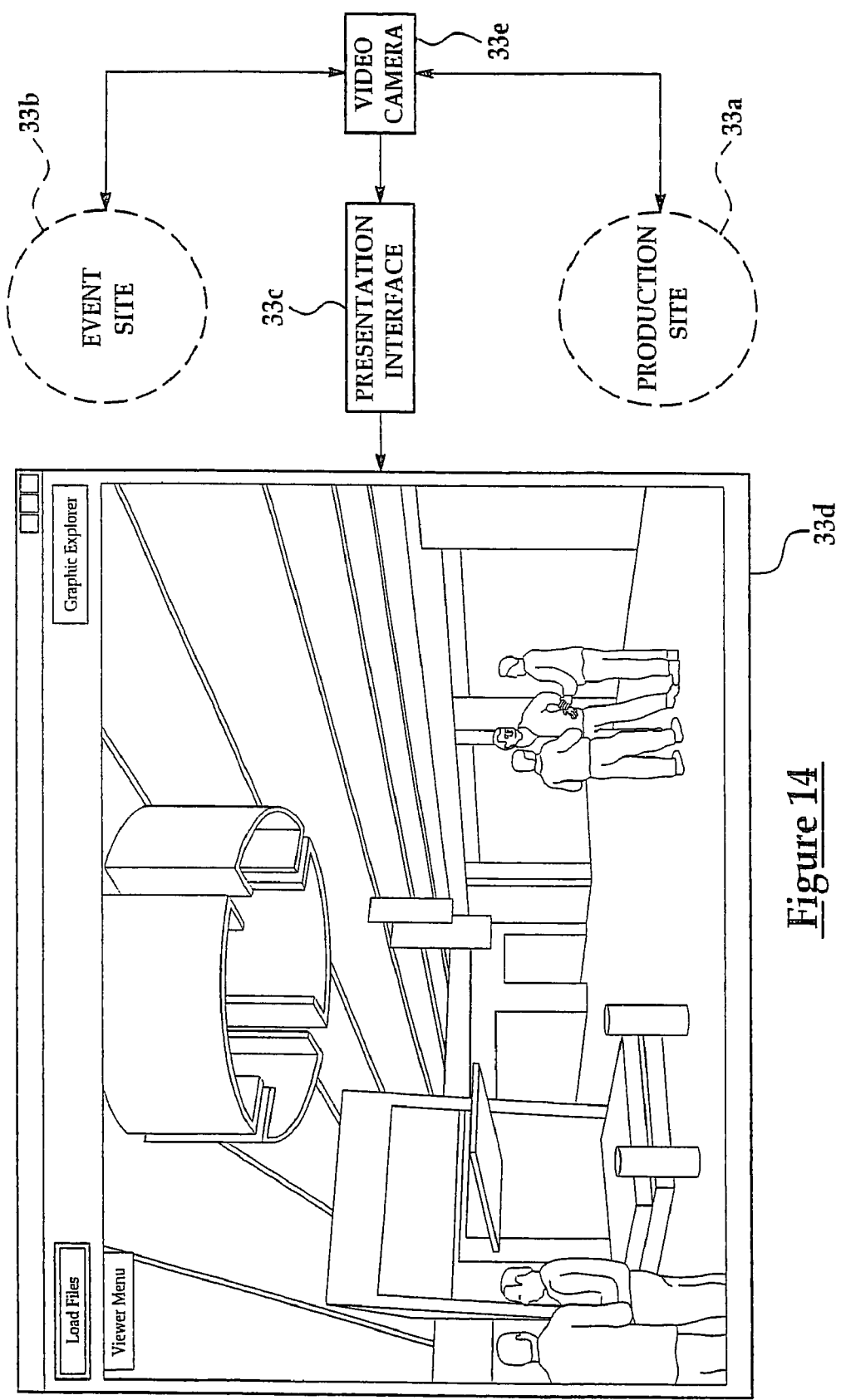
FIG. 14 is a sample screen having a real time image of the actual event construction site.
Figure 15:
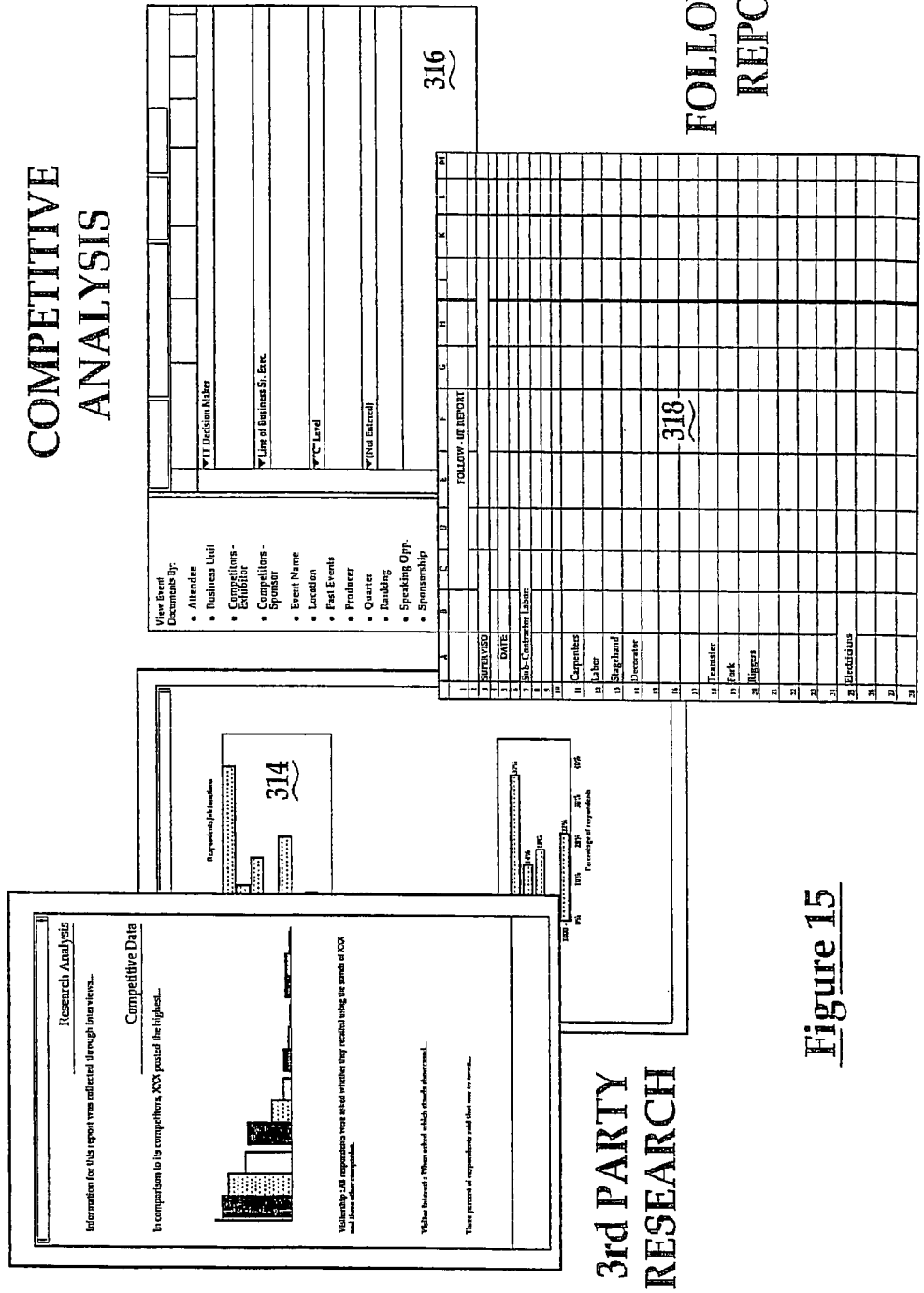
FIG. 15 are sample screens having information pertinent to third party research, competitive analyses, and follow up reports.
Figure 16:
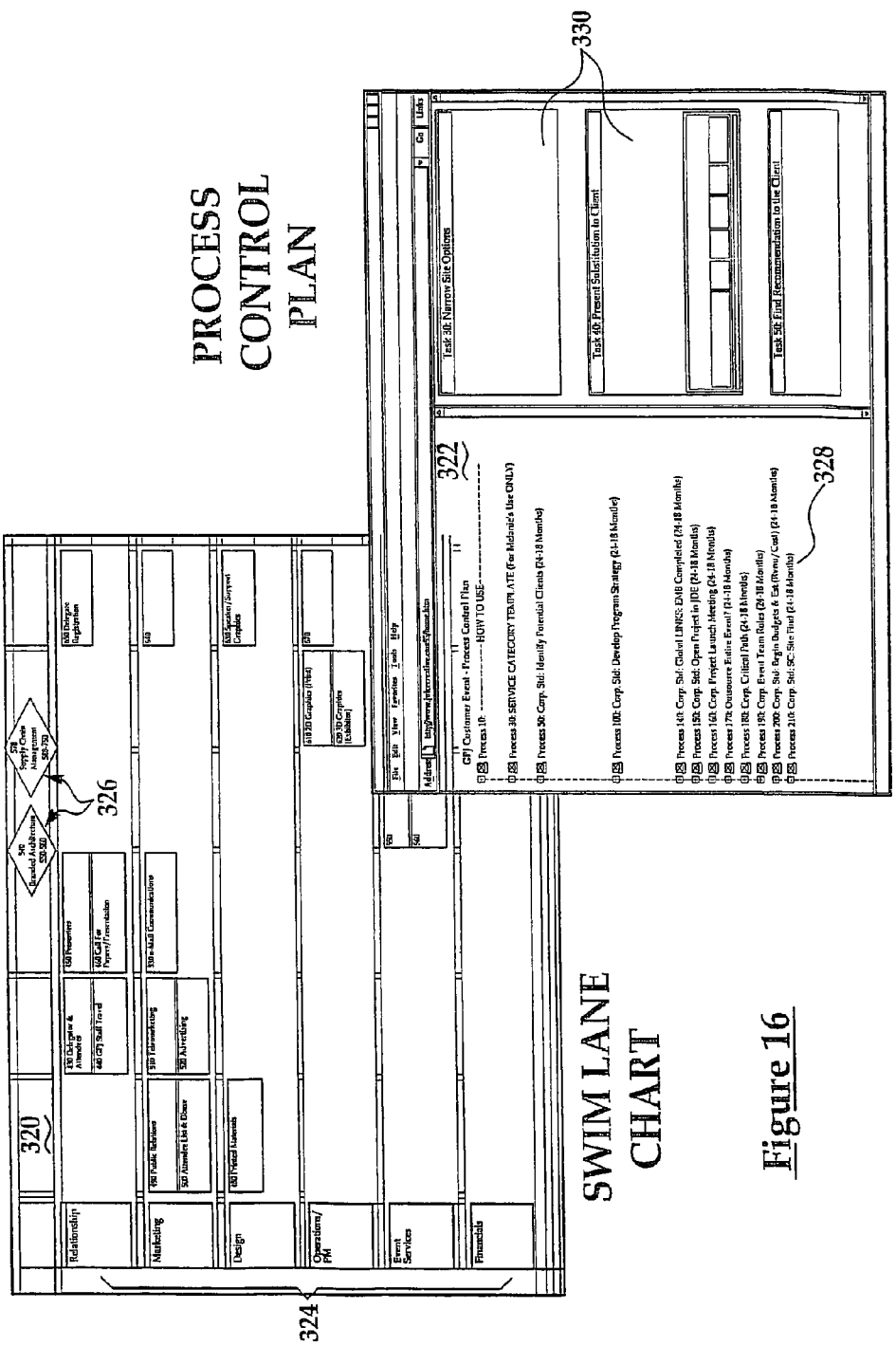
FIG. 16 are sample screens having information pertinent to swim lane charts and process control plan.

For illustrative purposes, selected examples of screens provided by the event management software as part of the digital interface 28 are described herein. The screen examples for the pre-event phase are illustrated in FIGS. 6–13, while the screen examples for the pre-event, event, and the post-event phases are illustrated in FIGS. 14–16.

Figure 6:
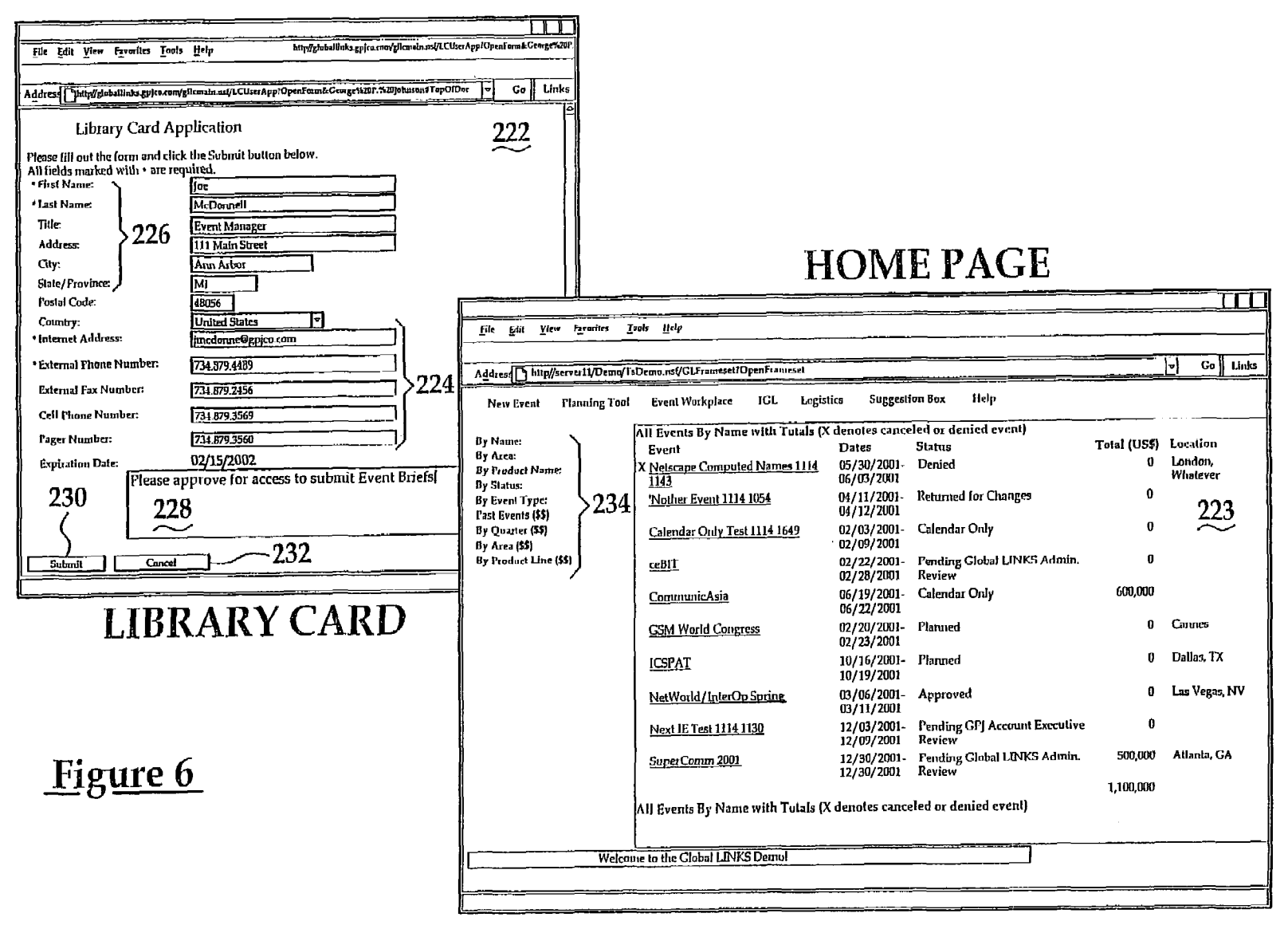

With reference to FIG. 6, sample screens are illustrated showing a library card application 222 and a homepage 223. The library card application contains a number of text boxes 224 as well as labels 226 to prompt an applicant for information. Additional information such as comments or requests are supplied via the comments box 228. The applicant utilizes an input device to provide the requested information in the appropriate text box 222, then selects the submit button 230 or the cancel button 232 to submit or cancel the information.

Upon receipt and verification of the submitted information by the event management software, the applicant is issued an identification component, such as a code or a login and password. Thereafter, the identification component is used to gain access through the restrictor component 30 to various portions of the database and the event management software based on a predetermination by the event manager.

The provider assigns each person involved in the project unique identification code. In certain system implementations, an access card containing the unique identification code may be provided to users. Regardless of implementation, however, each unique identification component is associated with a level of information access or restriction to portions of the information. For example, the suppliers have access only to project specifications, change orders, and the like. Financial information is limited to those parties that the client and event management authorize to access. The information in the database can be changed only by authorized persons and through appropriate interfaces. The home page 223 typically contains a variety of information pertinent to a client, event, area, past event or other criteria 234. When a user logs on to the system, the restrictor component software 30 is activated to provide limited access to the appropriate information.

Figure 7:
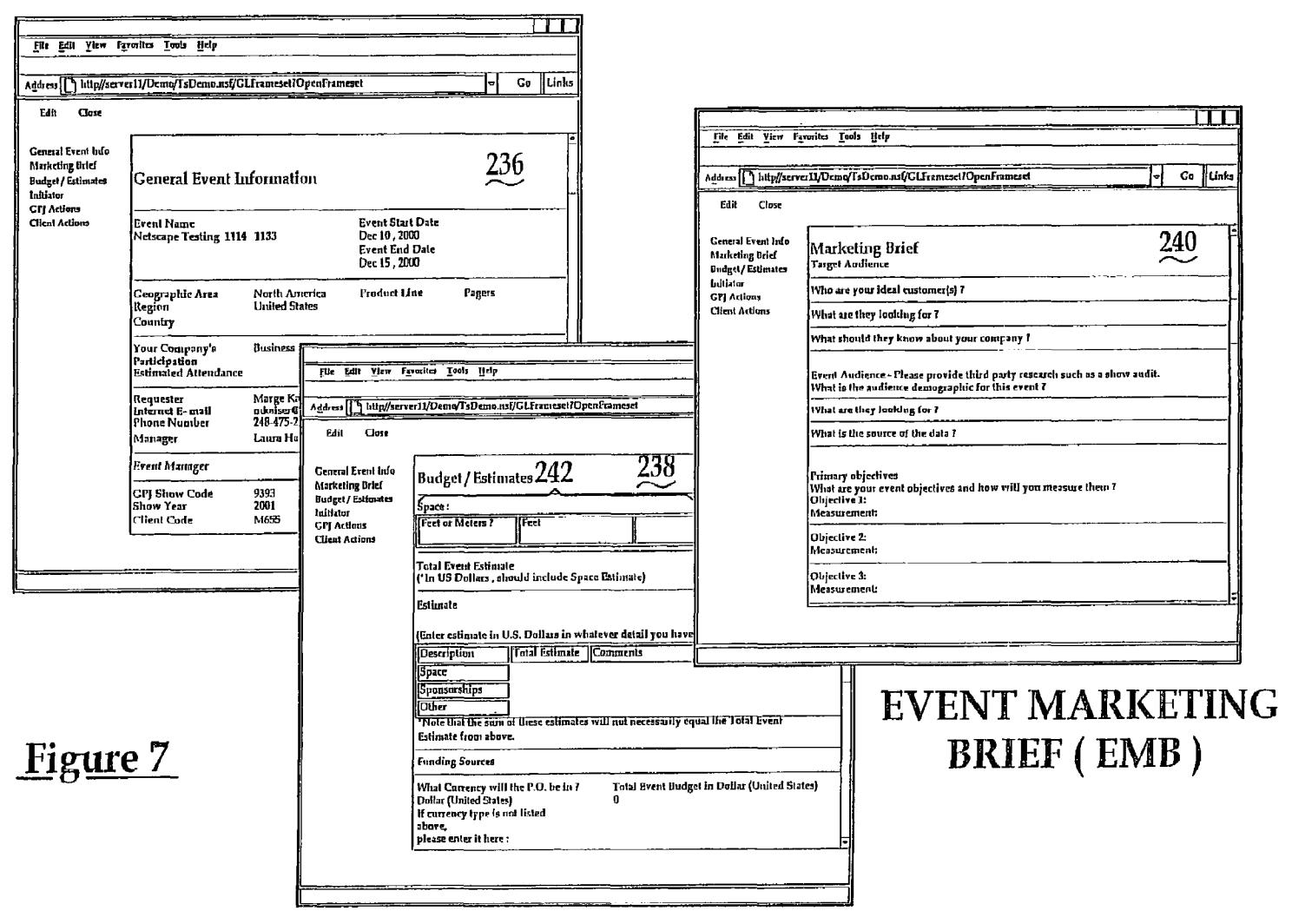

As shown in FIG. 7, sample screens contain information pertinent to an event marketing brief, including a general event information screen 236, a budget/estimates screen 238, and a marketing brief screen 240. The general event screen 236 provides general information pertinent to the event itself such as an event name, location, and contact information of the client. The budget/estimates screen 238 prompts the client to enter data in the estimate text boxes 242. After receiving the entered data in the estimates text boxes 242, the event management software calculates budget related data predicated on the entered data, and utilizes the output in the event management process. Similarly, and as illustrated in the marketing brief screen 240, the client is prompted for marketing-related data via a series of marketing questions 244. The client inputs answers or comments received by the event management software for utilization in the event management process.

Figure 8:
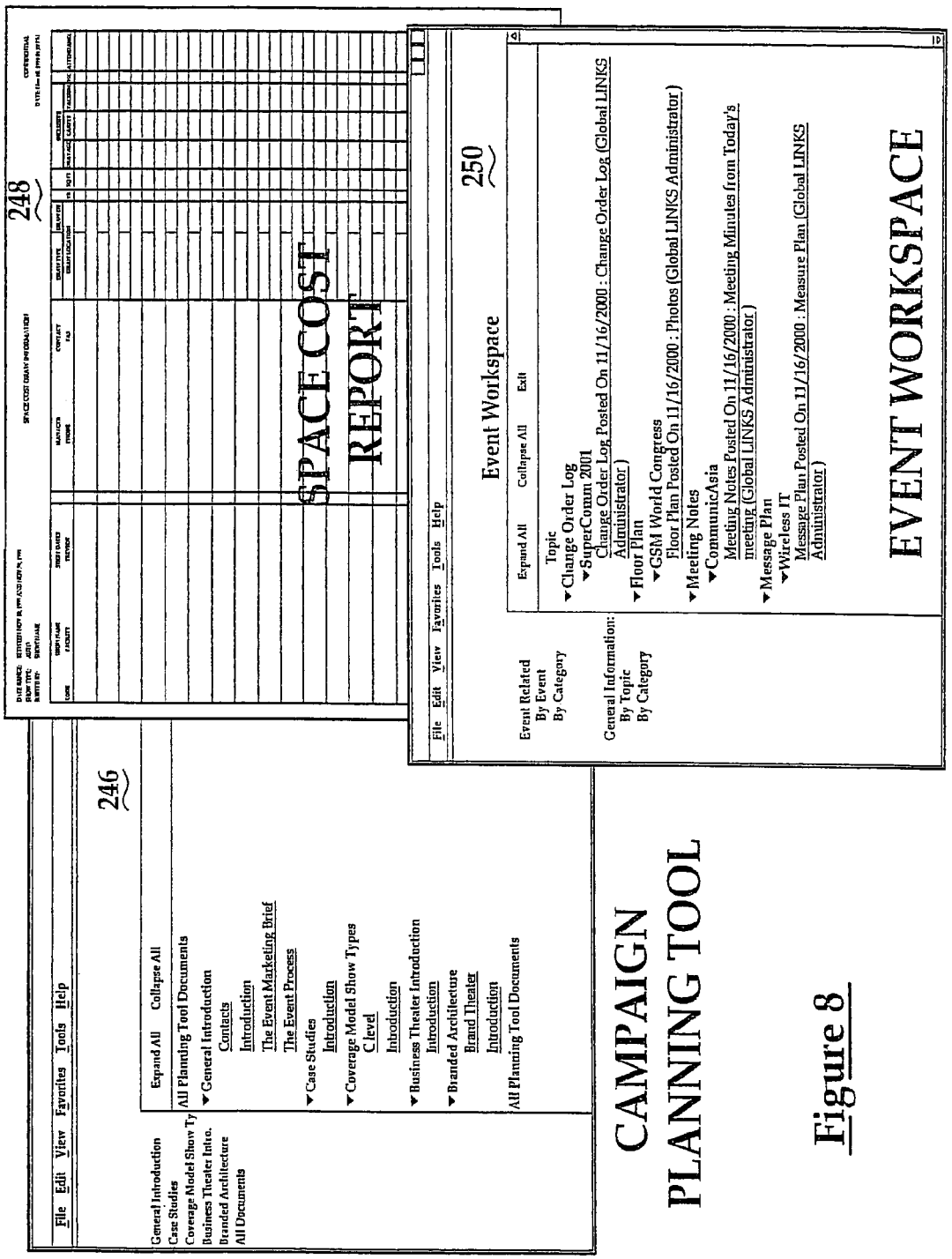
FIG. 8 are sample screens having information pertinent to campaign planning tools, space cost reports, and event workspace.

As illustrated in FIG. 8, sample screens are shown pertinent to campaign planning tools 246, space cost reports 248, and event workspace 250. The campaign planning tools screen 246 provides information related to, inter alia, case studies, show types, and branded architecture. The space cost report 248 provides a matrix of comparative information pertaining to a variety of events, the attendance for each event, the total square footage utilized at each event site, and other event particulars.

Figure 9:
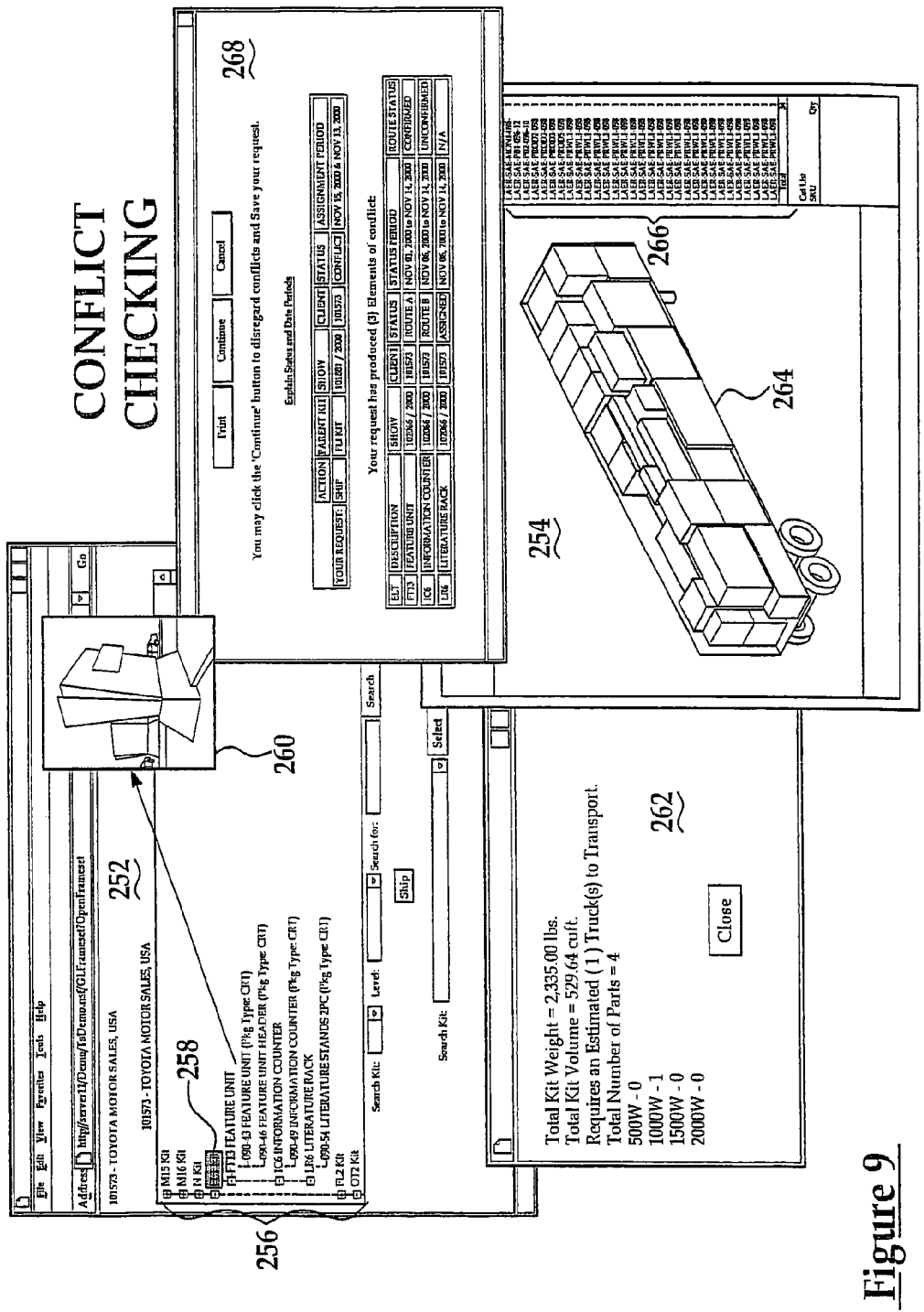
FIG. 9 are sample screens having information pertinent to inventory and conflict checks.

Referring now to FIG. 9, sample screens are shown pertinent to inventory 252 and conflict checks 254. The inventory 252 screen provides hierarchical menus of available kits. If an individual kit is selected 258, the event management software opens a graphical window having a graphical representation of the selected kit 260. The event management software also opens a window having information specific to the selected kit 262.

The conflicts check screen 254 provides a visual representation of the trailer or other means of transportation having optimal load conditions for various components of various shows. The conflicts check includes a text list 266 of all event components contained in the trailer. Further conflict check and confirmation information is provided in a property assignment window 268, including a component description, show, client, status, and conflicts.

Figure 10:
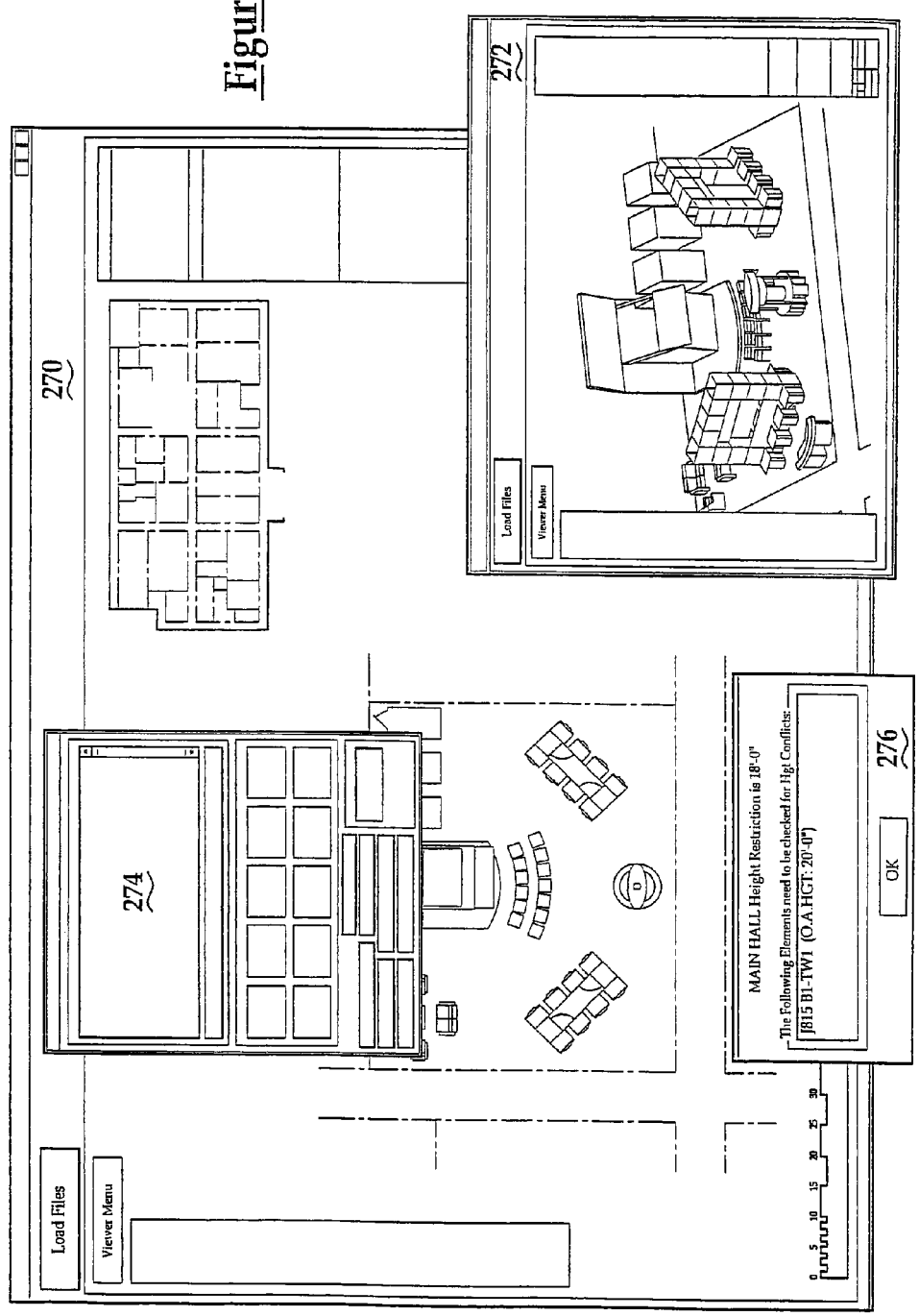
FIG. 10 are sample screens having information pertinent to space planning.

Turning to FIG. 10, sample screens illustrate tools for space planning. The tools include a plan view 270 of the event site modeled to scale and displaying all components planned for the event site. Another tools provides a three-dimensional representation 270 of the event site with height conflict information 276. Finally, symbolic and textual information 274 pertinent to each event site component is provided.

Figure 11:
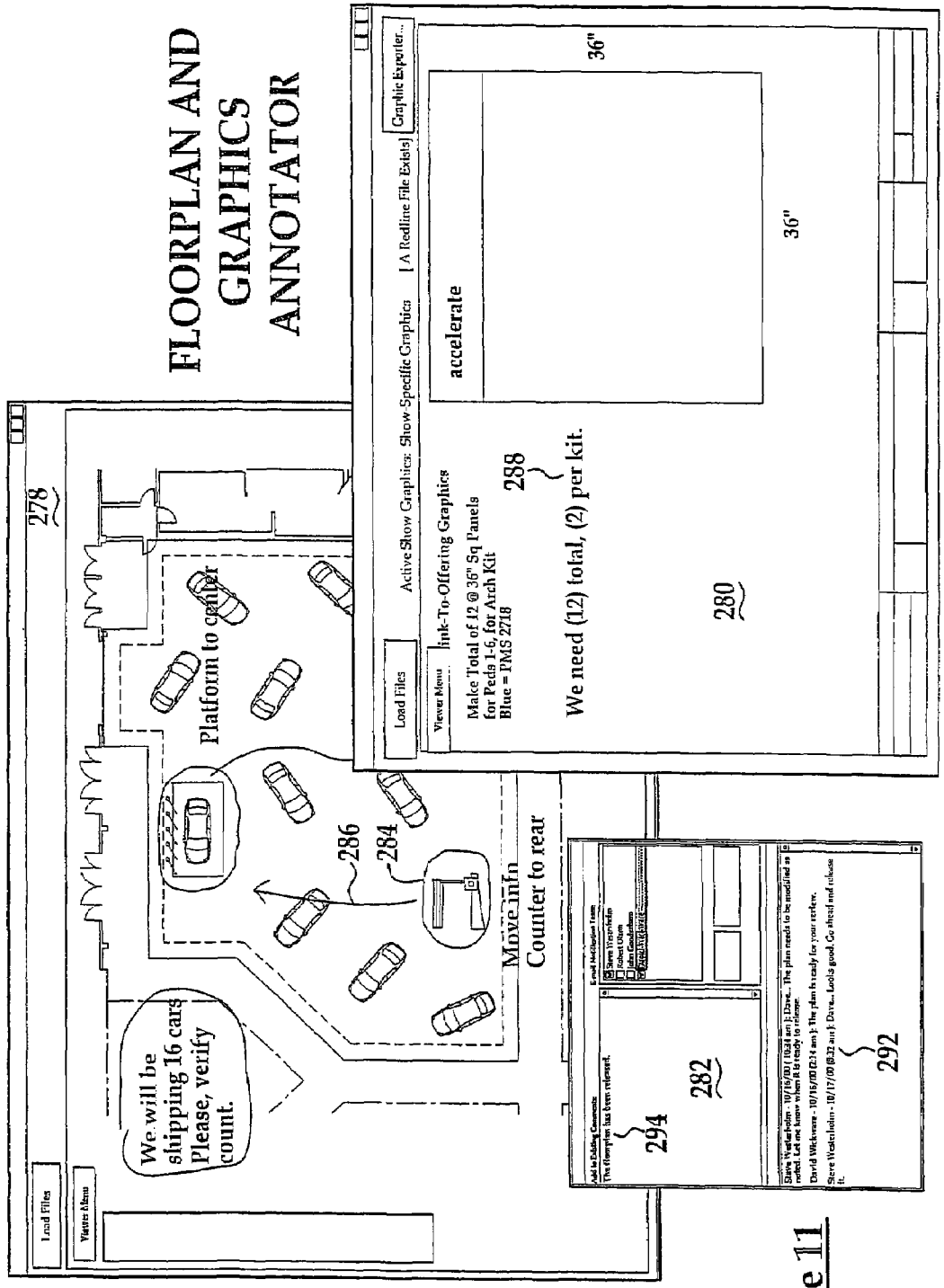
FIG. 11 are samples screens having information pertinent to floor plans, release screen, and graphics annotator.

With reference to FIG. 11, samples screens illustrate floor plans 278, a graphics annotator 280, and release screen 282. The floor plan annotator provides the functionality of a white board by displaying a plan view of the event site and permitting input designating changes to the floor plan. For example, a client utilizes a mouse or other input device to draw a circle 284 around an event site component, then draw an arrow 286 corresponding to a point in the event site where the event site component should be moved. The event manager receives the annotated screen, and effects the modification to the event site component, in accordance with the annotations of the client. The graphics annotator 280 provides means to request specific items 288. The release screen 282 includes a textual chronology of comments, etc. and a final notice of release 294 for the floorplan.

Figure 12:
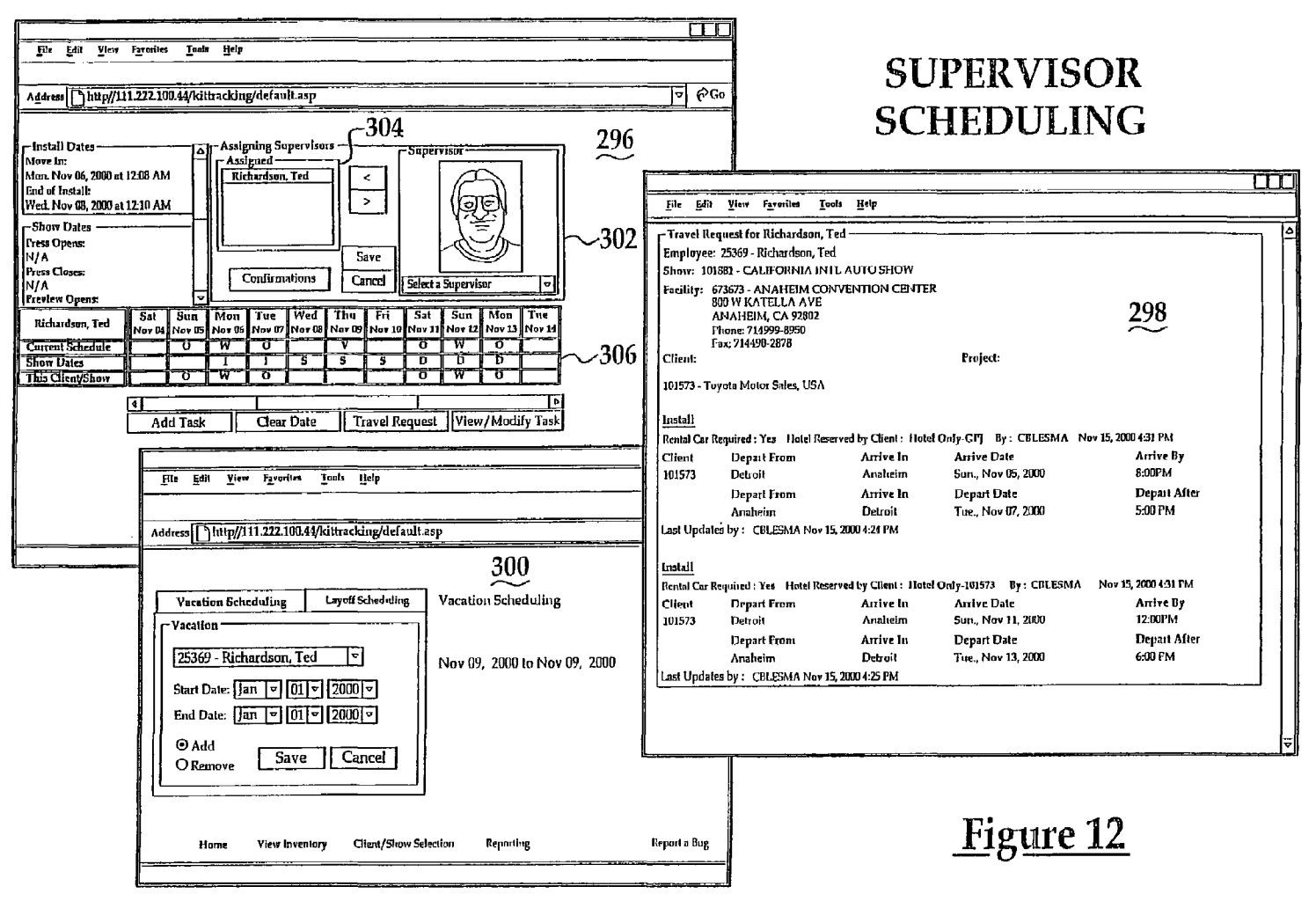

As shown in FIG. 12, sample screens illustrate pertinent to supervisor scheduling, including supervisor assignment 296, travel request 298, and vacation scheduling 300. The supervisor assignment 296 permits selection of a supervisor and presents a graphic image of the selected supervisor 302. Once selected, the name of the assigned supervisor is displayed 304. Calendar information 306 is provided as well.

The system includes a destination management section that permits the event manager to coordinate all travel related tasks. Information received from attendees or clients is displayed and then assembled for booking with the travel suppliers, such as airline, hotel, and car rental. For example, the travel request screen 298 displays information pertinent to the supervisor's travel itinerary. The vacation scheduling screen 300 receives input data related to vacation dates, and reconciles the event schedule to reflect the same.

Figure 13:
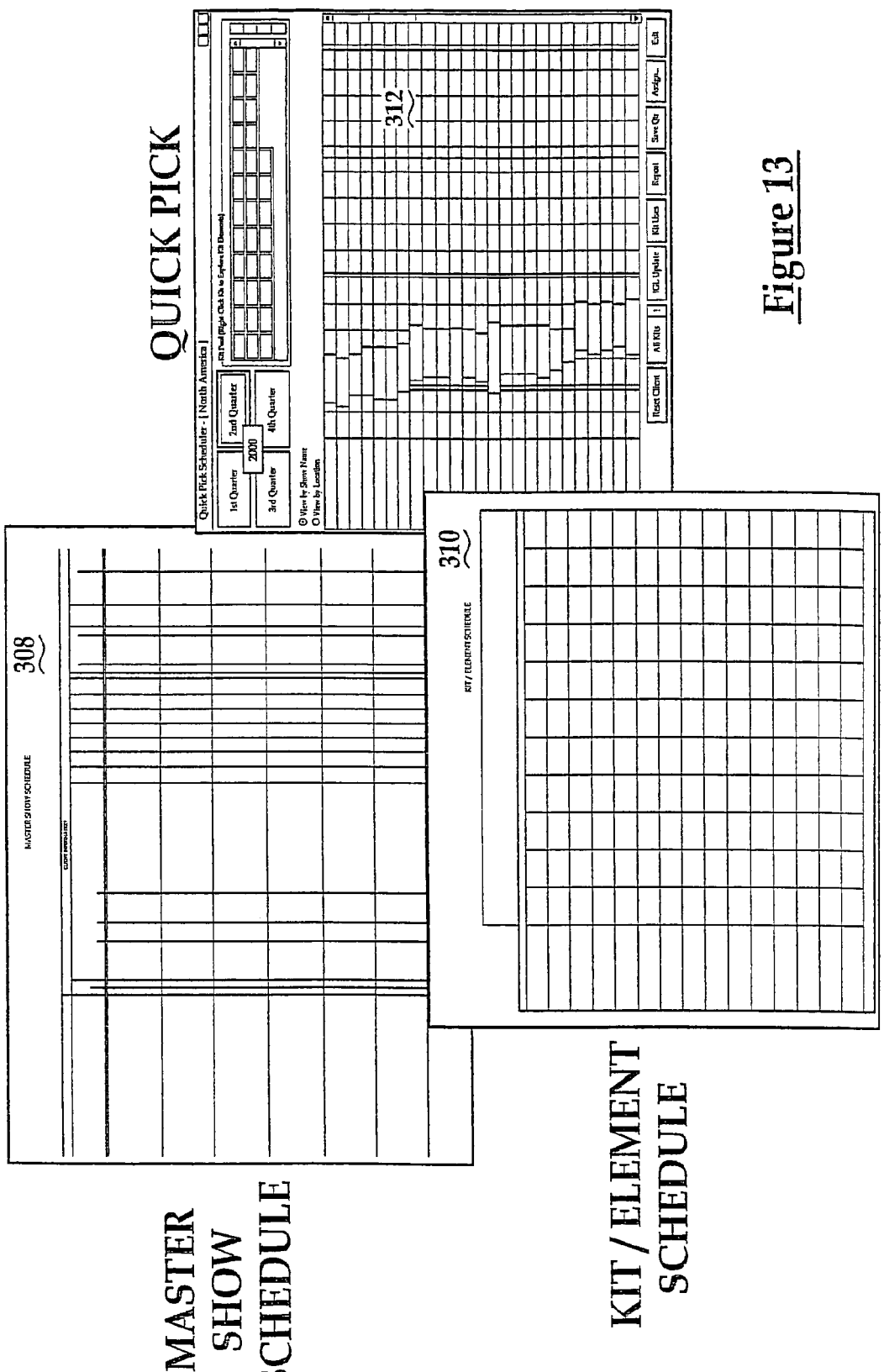
FIG. 13 are sample screens having information pertinent to master show schedule, kit and element schedule, and quick picks.

Referring now to FIG. 13, there are shown sample screens pertinent to master show schedule 308, kit and element schedule 310, and quick picks 312. The master show schedule 308 provides information pertinent to the all scheduled events of a particular event manager or the event management provider. The kit and element schedule 310 provides a matrix account of all equipment kits and event dates for which the kits are scheduled. The quick pick 312 displays all kits available and the dates on which they are available. The event management software permits selection of one or more kits for scheduling.

As shown in FIG. 14, during the pre-event, event, and post-event phases, the provider installs a video system including at least one video camera 33e at a location where event management activities are underway. Typically, these locations include the production site 33a and an event site 33b. The production site 33a generally refers to a physical location where a kit, booth, or other event components undergo construction. The event site encompasses the location or locations where the actual event takes place.

The video system permits real time viewing 33d of the exhibit as it is being produced and as it is installed. The system permits viewing from a number of different angles. The cameras are remotely enabled and digital images therefrom are displayed through the web browser on command. Thus, the event manager, client, and personnel may have a real time conference from remote locations to view the progress of the exhibit and to discuss changes and/or alterations to the exhibit. The installation and dismantling of the exhibit may also be viewed, as well as viewing of the exhibit during the event. The images are stored to permit replay by the managers and others, such as absentee attendees. As shown in FIG. 14, a sample screen illustrates a real time view of the event site for an actual event, wherein a video camera 313 or other device captures visual or other data related to a production site 33a or an event site 33b. A presentation interface; e.g., a software program, receives and translates the captured data into a format suitable for viewing via a webpage screen 33d.

With reference to FIG. 15, there is shown a screen sample having information pertinent to third party research 314, competitive analyses 316, and follow up reports 318. The third party research reports include research analysis data and competitive data displayed in textual, chart, or graph form. The third party research may be produced in written format or accessed as a screen display. The competitive analysis 316 provides information based on various criteria; e.g., attendees, business unit, competitors/exhibitors, location or the like.

Post event information is provided via the follow up report 318, which includes itemized data for contractor or subcontractor accounts, etc.

As shown in FIG. 16, sample screens illustrate a swim lane chart 320 and a process control plan 322. The swim lane chart provides categorical information 324 such as relationship, marketing, design, operations, event services and financial corresponding to a timeline 326 or other. The process control plan provides a hierarchy of information related to the process control plan, and information pertinent to specific tasks 330.

Thus is disclosed a system for the management and conduction of events which permits the event manager, clients, and suppliers to coordinate activities and rapidly disseminate information. Real time information is provided to the parties, including the ability to observe the progress of the production of the exhibit in real time from remote locations.

We claim:

1. An event management system for a plurality of users for use in event coordinating, the system being accessible by an event provider and by at least one non-provider user, the at least one non-provider user being from a group of event clients, vendors and suppliers, the system comprising:

a repository having information associated with event management, the repository including a database and having a first access permitting direct access to the repository by only an event provider and a second access permitting limited access to the repository by a non-provider user, said second access including a first digital interface permitting access to the repository by said non-provider user and a restriction component limiting access of said non-provider user to a defined portion of information in the repository, the restriction component including a plurality of unique identification codes, a record having all unique identification codes and a level of access corresponding to each unique identification code and a software interface, the software interface being operable to receive one unique identification code, search the record for the unique identification code, ascertain the level of access corresponding to the unique identification code and limiting access to the information in the database according to the ascertained level of access; and a device for capturing data and operable to communicate with the respository, said device being operable to be positioned at a remote location, capture data concerning that location and transmit the captured data to the respository.

2. The system of claim 1, further comprising an access card having one unique identifier number.

3. The system of claim 1, wherein the digital interface further comprises permitting modification of the information.

4. The system of claim 1, wherein the digital interface further comprises effecting corresponding changes to the information where such changes are necessitated by modification of the information.

5. The system or claim 1, further comprising a presentation component for displaying the captured data.

6. The system of claim 5, wherein the device for capturing data comprises a video camera, the video camera being operable to transmit images of the event display in real time to the repository such that such images are viewable by the event provider and the non-provider user.

7. The system or claim 5, wherein the presentation component includes a software interface to facilitate visual presentation of the captured data.

8. The system of claim 5, wherein the device for capturing data comprises a functionality component for capturing data from a production site.

9. The system of claim 5, wherein the device for data comprises a functionality component for capturing data from an event site.

10. The system of claim 1, wherein the device for capturing data comprises a camera, the camera being operable to transmit images of the event display to the repository such that such images are viewable by the event provider and the non-provider user.

11. The system of claim 10, wherein the camera comprises a video camera, the video camera being operable to transit images of the event display in real time to the repository such that such images are viewable by the event provider and the non-provider user.

12. An event management system for use in event coordinating, the system being accessible by an event provider and by a plurality of non-provider users and being accessible via a communication network, the non-provider users being from a group of event clients, vendors and suppliers, the system comprising;

a server accessible via the communications network;
a database having event management information, the database being associated with the server;
a digital interface to facilitate access to the database by a plurality of non-provider users;
a plurality of unique identification codes, each unique identification code permitting limited access to the event management information;
a record having all unique identification codes and a level of access corresponding to each unique identification code;
a restriction interface, the restriction interface being operable to receive a unique identification code, search the record for the unique identification code, verify the unique identification code, and limit access to the event management information according to the ascertained level of access;

a video camera for capturing detail pertinent to a production site and an event site, the video camera being operable to transmit images of the event display in real time to the sewer such that such images are viewable by the event provider and the non-provider user; and a presentation interface for presenting the captured detail.

13. The system of claim 12, wherein, the server further comprises a website server.

14. The system of claim 12, further comprising a plurality of access cards, each access card having a unique identification code.

15. The system of claim 12, wherein the presentation of the captured detail further comprises multimedia presentation of the data.

16. The system of claim 12, further comprising a plurality of reports related to an event.

17. The system of claim 16, wherein the plurality of reports embody webpage formats.

18. The system of claim 12, further comprising an arrangement component for facilitating travel accommodations.

19. The system of claim 18, wherein the arrangement component embodies a webpage format.

20. The system of claim 12, further comprises a modification component for facilitating interrelated changes to the information in the database.

21. An avant management system for use in event coordinating, the system being accessible by an event provider and by at least on non-provider users, the at least one non-provider user being from a group of event clients, vendors and suppliers, the system comprising:

a server;
a database associated with said server, the database having event management information, a first access and a second access, the first and second access including a digital interface that permits a provider and a plurality of non-provider uses to access the database; and
a restriction component associated with the second access, the restriction component limiting access of the plurality of non-provider users to a defined portion of event management information in the database and including a plurality of unique identification codes, a record having all unique identification codes and a level of access corresponding to each unique identification code and a software interface, the software interface being operable to receive a unique identification code, search the record for the unique identification code, ascertan the level of access corresponding to the unique identification code and limit access to the information in the database according to the ascertained level of access; and
a device far capturing data and operable to communicate with the server said device being operable to be positioned at a remote location, capture data concerning that location and transmit the captured data to the server.

22. The system of claim 21, wherein the server comprises a website server.

23. The system of claim 21, farther comprising a presentation component for displaying the captured data.

24. The system of claim 23, wherein the device for capturing data comprises a video camera, the video camera being operable to transmit images of the event display in real time to the server such that such images are viewable by the event provider and the non-provider user.

* * * * *

UNITED STATES PATENT AND TRADEMARK OFFICE
CERTIFICATE OF CORRECTION

| | | |
|---|---|---|
| PATENT NO. | : 7,010,530 B2 | Page 1 of 1 |
| APPLICATION NO. | : 09/755924 | |
| DATED | : March 7, 2006 | |
| INVENTOR(S) | : Brian Bartkowiak et al. | |

It is certified that error appears in the above-identified patent and that said Letters Patent is hereby corrected as shown below:

Column 9, line 41 - Replace "transit" with --transmit--.

Signed and Sealed this

First Day of August, 2006

JON W. DUDAS
*Director of the United States Patent and Trademark Office*